(12) United States Patent
Kawashima

(10) Patent No.: US 12,459,746 B2
(45) Date of Patent: Nov. 4, 2025

(54) TRANSPORT CONVEYOR AND V-SHAPED TRANSPORT MECHANISM INCLUDING THE SAME

(71) Applicant: YAMATO SCALE CO., LTD., Akashi (JP)

(72) Inventor: Takaaki Kawashima, Akashi (JP)

(73) Assignee: YAMATO SCALE CO., LTD., Hyogo (JP)

( * ) Notice: Subject to any disclaimer, the term of this patent is extended or adjusted under 35 U.S.C. 154(b) by 42 days.

(21) Appl. No.: 18/556,921

(22) PCT Filed: Aug. 23, 2021

(86) PCT No.: PCT/JP2021/030858
§ 371 (c)(1),
(2) Date: Oct. 24, 2023

(87) PCT Pub. No.: WO2023/026336
PCT Pub. Date: Mar. 2, 2023

(65) Prior Publication Data
US 2024/0208734 A1    Jun. 27, 2024

(51) Int. Cl.
*B65G 23/44*    (2006.01)
*B65G 23/04*    (2006.01)

(52) U.S. Cl.
CPC .............. *B65G 23/44* (2013.01); *B65G 23/04* (2013.01)

(58) Field of Classification Search
None
See application file for complete search history.

(56) References Cited

U.S. PATENT DOCUMENTS

| 5,927,478 | A  | * | 7/1999 | Archer  | B65G 21/2081 |
| | | | | | 198/841 |
| 6,685,009 | B1 | * | 2/2004 | Hosch   | B65G 23/44 |
| | | | | | 198/813 |
| 7,793,773 | B2 | * | 9/2010 | Beck    | B65G 47/2445 |
| | | | | | 198/584 |
| 9,132,971 | B2 | * | 9/2015 | Overly  | B65B 35/50 |

(Continued)

FOREIGN PATENT DOCUMENTS

DE    102019110273 A1 * 10/2020   ............ B65G 23/22
JP    H07285631 A   * 10/1995

(Continued)

*Primary Examiner* — Gene O Crawford
*Assistant Examiner* — Muhammad Awais
(74) *Attorney, Agent, or Firm* — Alleman Hall & Tuttle LLP

(57) ABSTRACT

Provided are: a transport conveyor that makes it possible to reduce the maintenance frequency thereof; and a V-shaped transport mechanism including the transport conveyor. The transport conveyor includes: a first pulley that rotates about a first rotating shaft; a second pulley that rotates about a second rotating shaft; a pair of frames that support the first rotating shaft and the second rotating shaft; and a conveyor belt wound around, and extending between, the first pulley and the second pulley. At least one frame of the pair of frames is configured as an offset frame including offset supports, the offset supports supporting the first rotating shaft and the second rotating shaft at respective positions that are located inward of both ends of the conveyor belt in a width direction thereof.

6 Claims, 5 Drawing Sheets

(56) References Cited

U.S. PATENT DOCUMENTS

| | | | |
|---|---|---|---|
| 2003/0183493 A1* | 10/2003 | Ertel | B65G 23/44 |
| | | | 198/813 |
| 2004/0118663 A1* | 6/2004 | Gaeddert | B65G 21/105 |
| | | | 198/813 |
| 2010/0147651 A1* | 6/2010 | Ancarani | B65G 47/26 |
| | | | 198/443 |
| 2014/0083816 A1* | 3/2014 | Kawanishi | B65G 43/08 |
| | | | 198/341.03 |
| 2015/0259151 A1* | 9/2015 | Fonnelop | G07F 7/06 |
| | | | 198/813 |
| 2020/0130939 A1* | 4/2020 | Davies | B65G 21/12 |

FOREIGN PATENT DOCUMENTS

| | | | | |
|---|---|---|---|---|
| JP | 3911760 B2 * | 5/2007 | | |
| JP | 2011209156 A | 10/2011 | | |
| JP | 2012202937 A | 10/2012 | | |
| WO | WO-2006010032 A2 * | 1/2006 | | B65G 47/2445 |

* cited by examiner

TRANSPORT CONVEYOR AND V-SHAPED TRANSPORT MECHANISM INCLUDING THE SAME

TECHNICAL FIELD

The present invention relates to a transport conveyor and a V-shaped transport mechanism including the same.

BACKGROUND ART

Conventionally, there are known combination weighers that weigh out objects to be weighed to a target weight. There are cases where such a combination weigher is equipped with a transport mechanism in which a transport conveyor is used for transporting the objects to be weighed.

For example, Patent Literature 1 indicated below discloses a transport mechanism for transporting objects to be weighed to a hopper before weighing them. The transport mechanism includes two belts (i.e., includes a two-belt transport conveyor), and is configured such that the two belts extend in a transporting direction and are arranged in parallel with each other to form a V shape.

Patent Literature 2 indicated below discloses a semi-automatic combination weigher equipped with a transport mechanism. The semi-automatic combination weigher is configured such that objects to be weighed are manually fed to the combination weigher and then the weighed objects are automatically discharged from the combination weigher. The transport mechanism is intended for transporting the weighed objects that are discharged from a hopper. The transport mechanism includes two transport conveyors that are arranged in parallel with each other such that, as seen in a transporting direction, transport surfaces of the respective two transport conveyors are in a V shape.

CITATION LIST

Patent Literature

PTL 1: Japanese Laid-Open Patent Application Publication No. 2011-209156
PTL 2: Japanese Laid-Open Patent Application Publication No. 2012-202937

SUMMARY OF INVENTION

Technical Problem

However, transport mechanisms in which a conventional transport conveyor is used have a room for improvements. A transport conveyor includes: a driving pulley and a following pulley, each of which is configured to be rotatable about a shaft via a bearing; a conveyor belt wound around these pulleys; and a pair of left and right frames that support the shafts of the driving and following pulleys. The driving pulley and the following pulley are provided between the pair of frames. In the case of a general transport conveyor, each pulley used therein has an axial length corresponding to the width of the conveyor belt. Accordingly, the pair of frames are, in the width direction of the conveyor belt, positioned outward of both ends of the conveyor belt in the width direction thereof.

In such a transport conveyor, there is a risk that, at both ends of the conveyor belt in the width direction thereof, scraps of objects to be weighed, dust, etc., enter the gaps between the pulleys and the frames. In particular, in the case of a V-shaped transport mechanism, such as one disclosed in the above Patent Literature 1 or 2, the scraps, dust, etc., are likely to enter, in the width direction of the conveyor belts, an end portion side of the mechanism, the end portion side being positioned at a lower elevation. In a case where the objects to be weighed are, for example, food products, if the scraps, dust, etc., enter the gaps between the pulleys and the frames, it results in an insanitary condition. Moreover, if the scraps, dust, etc. that have entered the gaps between the pulleys and the frames are accumulated, they come into contact with the bearings. This may cause a problem, such as causing damage to the bearings, or hindering the rotation of the pulleys. Thus, transport mechanisms for transporting objects to be weighed by using a conventional transport conveyor have a room for improvements in terms of reducing the maintenance frequency thereof.

In view of the above, an object of the present invention is to provide a transport conveyor that makes it possible to reduce the maintenance frequency thereof and to provide a V-shaped transport mechanism including the transport conveyor.

Solution to Problem

A transport conveyor according to one aspect of the present invention includes: a first pulley that rotates about a first rotating shaft; a second pulley that rotates about a second rotating shaft; a pair of frames that support the first rotating shaft and the second rotating shaft; and a conveyor belt wound around, and extending between, the first pulley and the second pulley. At least one frame of the pair of frames is configured as an offset frame including offset supports, the offset supports supporting the first rotating shaft and the second rotating shaft at respective positions that are located inward of both ends of the conveyor belt in a width direction thereof.

According to the above configuration, at the offset supports of the offset frame, gaps between the frame and the pulleys are positioned inward of both ends of the conveyor belt in the width direction thereof. For this reason, even if scraps, dust, etc. fall from the end of the offset frame side of the conveyor belt in the width direction thereof, the scraps, dust, etc. can be prevented from entering the gaps. Therefore, the transport conveyor can be kept hygienic, and smooth rotation of the pulleys can be maintained. This makes it possible to reduce maintenance frequency.

The pair of frames may include: a pair of frame bodies including respective outer surfaces that are orthogonal to the first rotating shaft and the second rotating shaft; and a pair of tension adjusters that are connected to the pair of frame bodies and that adjust tension of the conveyor belt by adjusting a distance between the first pulley and the second pulley. The pair of tension adjusters may be provided outward of the respective outer surfaces of the pair of frame bodies in the width direction of the conveyor belt. Of the pair of tension adjusters, the tension adjuster provided on the offset frame side may be positioned between one of the offset supports and an end of the offset frame side of the conveyor belt in the width direction thereof.

According to the above configuration, the tension adjuster provided on the offset frame side is positioned inward of both ends of the conveyor belt in the width direction thereof. Accordingly, for example, in a case where a V-shaped transport mechanism is configured by arranging two transport conveyors in a V shape, by arranging the two transport conveyors such that their offset frame sides are positioned at the valley (i.e., in the middle) of the V shape, a gap between two conveyor belts can be made small. This makes it possible to suppress objects to be weighed, scraps of the objects, etc. from falling through the gap between the conveyor belts.

The pair of frames may include a pair of frame bodies including respective outer surfaces that are orthogonal to the first rotating shaft and the second rotating shaft. Each of the first pulley and the second pulley may include: a main pulley that is disposed between the pair of frame bodies; and an auxiliary pulley that is, in the width direction of the conveyor belt, disposed outward of one of the offset supports of the offset frame.

According to the above configuration, the auxiliary pulleys are disposed outward of the offset supports of the offset frame, respectively. Accordingly, at both ends of the conveyor belt in the width direction thereof, the pulleys can be made in contact with the conveyor belt while the supporting positions of the rotating shafts on at least one of the pair of frames are located inward of both ends of the conveyor belt in the width direction thereof. As a result, in the width direction of the conveyor belt, at the end of the offset frame side of each of the main pulleys (i.e., at positions that are inward of both ends of the conveyor belt in the width direction thereof), excessive tension of the conveyor belt can be prevented from occurring. Consequently, deterioration of the conveyor belt due to such excessive tension can be suppressed.

A V-shaped transport mechanism according to another aspect of the present invention is a V-shaped transport mechanism in which two transport conveyors are arranged such that, as seen in a transporting direction, transport surfaces of the respective two transport conveyors are in a V shape. Each of the two transport conveyors is the transport conveyor having the above-described configuration, and in each of the two transport conveyors, the first rotating shaft and the second rotating shaft are arranged in an inclined manner, such that the offset frame is positioned at a lower elevation than the other frame.

According to the above configuration, each of the two transport conveyors is arranged such that the offset frame side thereof is positioned at a lower elevation. Accordingly, even if scraps of objects to be weighed, dust, etc. fall from the end of the offset frame side of the conveyor belt in the width direction thereof, the scraps, dust, etc. can be prevented from entering the gaps between the offset frame and the pulleys. Therefore, the transport conveyors can be kept hygienic, and smooth rotation of the pulleys can be maintained. This makes it possible to reduce maintenance frequency. Moreover, since a tension adjuster that adjusts the tension of the conveyor belt can be disposed between the offset frame and the end of the offset frame side of the conveyor belt in the width direction thereof, the gap between the two conveyor belts can be made small. This makes it possible to suppress objects to be weighed, scraps of the objects, etc. from falling through the gap between the two conveyor belts.

One transport conveyor of the two transport conveyors may be arranged such that an end of the offset frame side of the one transport conveyor in the width direction of the conveyor belt is positioned over the conveyor belt of the other transport conveyor of the two transport conveyors.

According to the above configuration, the gap between the two conveyor belts can be further reduced.

Advantageous Effects of Invention

The present invention makes it possible to reduce the maintenance frequency of a transport conveyor and to reduce the maintenance frequency of a V-shaped transport mechanism including the transport conveyor.

DESCRIPTION OF EMBODIMENTS

Figure 1:
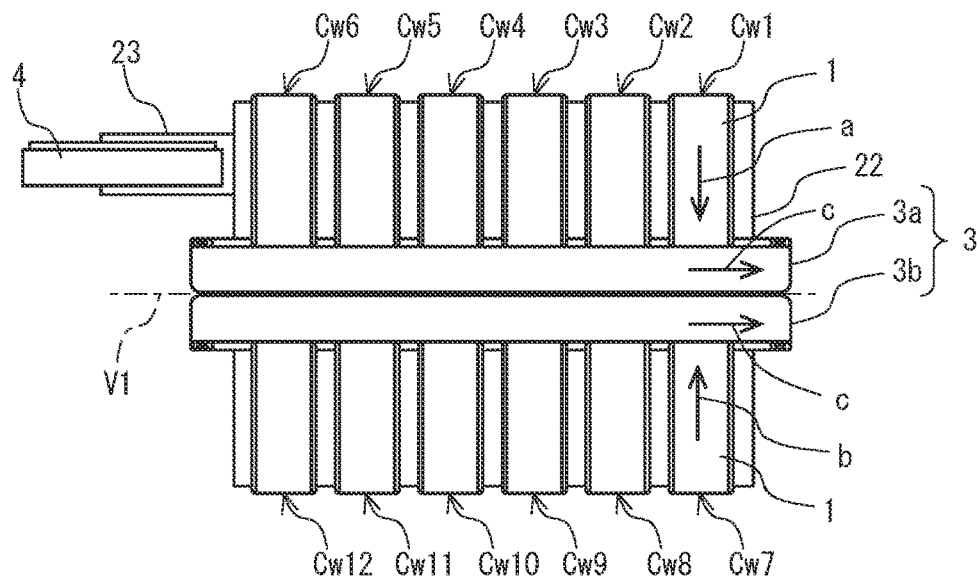
FIG. 1 is a plan view showing a combination weigher to which transport conveyors according to one embodiment of the present invention are applied.
Figure 2:
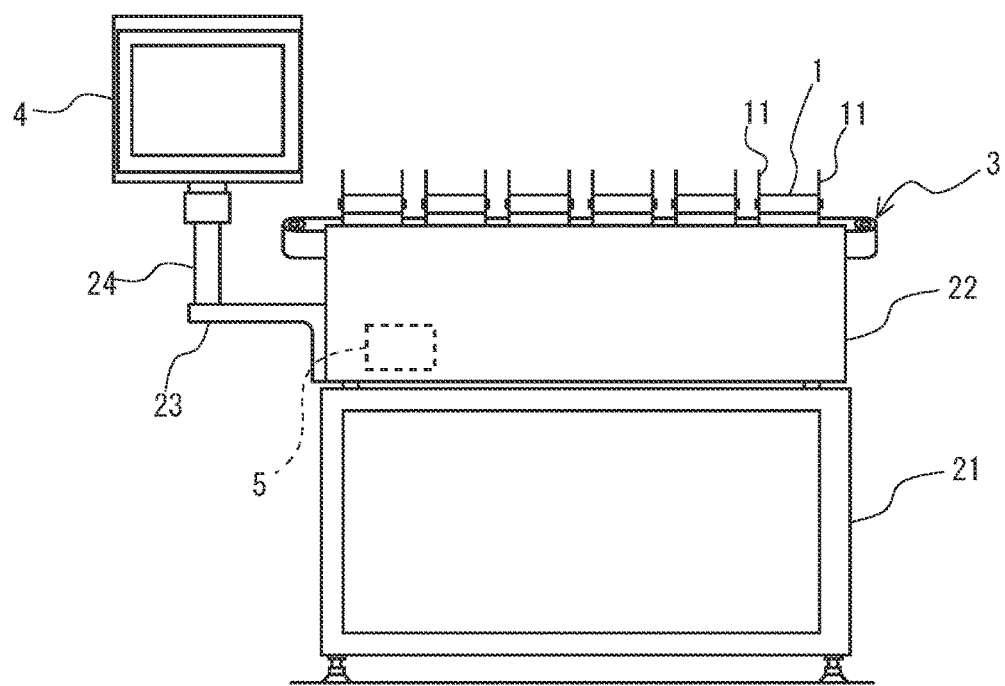
FIG. 2 is a front view of the combination weigher of FIG. 1.
Figure 3:
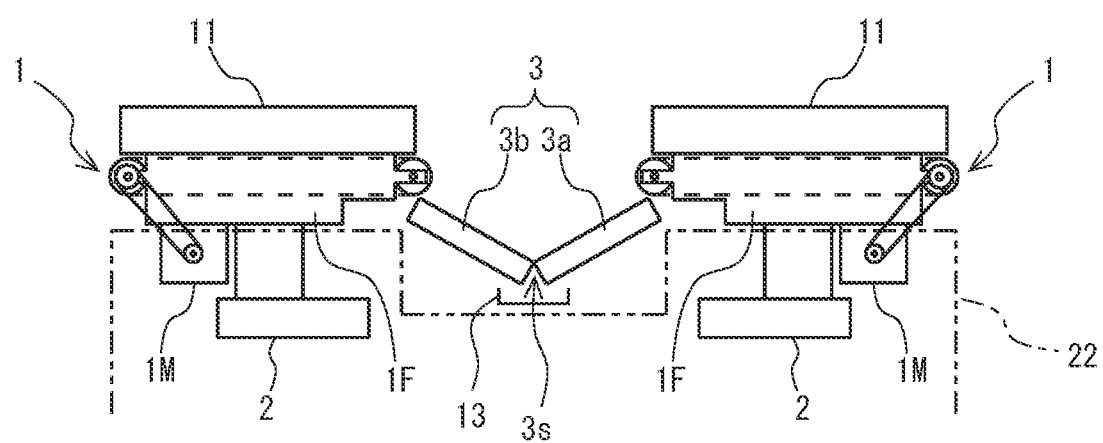
FIG. 3 is a partial enlarged view showing a detailed structure in the vicinity of the transport conveyors in the combination weigher of FIG. 1.

Hereinafter, transport conveyors according to one embodiment of the present invention, and a V-shaped transport mechanism including the transport conveyors, are described. In the present embodiment, a semi-automatic combination weigher equipped with the V-shaped transport mechanism is illustratively described. As shown in FIG. 1 to FIG. 3, the combination weigher of the present embodiment includes a plurality of weighing parts Cw1 to Cw12, a V-shaped transport mechanism 3, an operation setting display device 4, a controller 5, and so forth.

Each of the plurality of weighing parts Cw1 to Cw12 includes: a weighing conveyor 1 configured as a belt conveyer; and a weight sensor 2, which weighs objects to be weighed that are held on the weighing conveyor 1, the weight sensor 2 including, for example, a load cell that supports the weighing conveyor 1. Each weighing conveyor 1 is provided with a pair of guide plates 11, which prevent the objects to be weighed from falling from both sides of the weighing conveyor 1. Specifically, for example, as shown in FIG. 3, the guide plates 11 are mounted to a conveyor frame 1F. Further, the bottom surface of the conveyor frame 1F of each weighing conveyor 1 is mounted with a driving motor 1M, which drives the weighing conveyor 1. The weight sensor 2 is, inside an equipment body 22, fixed to an unshown fixing member. The conveyor frame 1F is mounted to the top of the weight sensor 2 via a mounting member. That is, the weight sensor 2 supports the weighing conveyor 1 including the pair of guide plates 11 and the driving motor 1M. It should be noted that, in the present embodiment, the weighing conveyor 1 and the weight sensor 2 are distinguished from each other. However, in some cases, equipment including both the weighing conveyor 1 and the weight sensor 2 may be referred to as a weighing conveyor.

The V-shaped transport mechanism 3 includes two transport conveyors 3a and 3b, and is disposed between six weighing parts Cw1 to Cw6 and other six weighing parts Cw7 to Cw12. The six weighing conveyors 1 of the respective weighing parts Cw1 to Cw6 are arranged in parallel with each other on one lateral side of the V-shaped transport mechanism 3, such that the transporting direction of each weighing conveyor 1 (the direction indicated by arrow a) is orthogonal to the transporting direction of the V-shaped transport mechanism 3 (the direction indicated by arrow c). The six weighing conveyors 1 of the respective weighing parts Cw7 to Cw12 are arranged in parallel with each other on the other lateral side of the V-shaped transport mechanism 3, such that the transporting direction of each weighing conveyor 1 (the direction indicated by arrow b) is orthogonal to the transporting direction of the V-shaped transport mechanism 3 (the direction indicated by arrow c).

As shown in FIG. 3, the V-shaped transport mechanism 3 is configured such that the two transport conveyors 3a and 3b, each of which includes an endless conveyor belt, are arranged in parallel with each other in such a manner that, as seen in the transporting direction of the V-shaped transport mechanism 3, the transport surfaces of the respective two transport conveyors 3a and 3b are in a V shape. The same transporting speed is set for these two transport conveyors 3a and 3b. In the description herein, the direction of arrow c is set as the transporting direction. There is a gap 3s between these two transport conveyors 3a and 3b. A tray 13 to receive and hold scraps, dust, etc. that fall through the gap 3s is placed under the gap 3s. The tray 13 can be pulled out, and thereby the dust and the like accumulated thereon can be discarded. An angle formed by the transport surfaces of the respective two transport conveyors 3a and 3b is not particularly limited, but may be, for example, about 90 degrees. This angle may be made adjustable.

In the present embodiment, the V-shaped transport mechanism 3 transports objects to be weighed in the direction of arrow c, and discharges the transported objects from the downstream end of the V-shaped transport mechanism 3 in the transporting direction. Subsequent equipment is installed at the downstream end of the V-shaped transport mechanism 3 in the transporting direction. The objects to be weighed are, after being transported by the V-shaped transport mechanism 3, fed to the subsequent equipment.

The equipment body 22 is mounted to the top of a frame 21, and the V-shaped transport mechanism 3 is mounted to the top of the equipment body 22. It should be noted that the illustration of mounting support members and driving motors of the transport conveyors 3a and 3b is omitted. A support member 23 is mounted to the lateral side of the equipment body 22, and the operation setting display device 4 is mounted to the support member 23 via a support pillar 24.

Objects to be weighed that are held on each weighing conveyor 1 are weighed by the weight sensor 2 supporting the weighing conveyor 1. The resulting weighing value (analogue weight signal) is subjected to A/D conversion, and then transmitted to the controller 5. The controller 5 is configured as, for example, a microcontroller. The controller 5 includes: an arithmetic control unit, such as a CPU; and a memory including, for example, a RAM and ROM. The memory stores therein a running program, operation parameter data, weighing data, etc. As a result of the arithmetic control unit executing the running program stored in the memory, the controller 5 performs control of the entire combination weigher, combination calculation processing, etc.

Hereinafter, the transport conveyor 3a is described in more detail. It should be noted that the transport conveyor 3b is configured to be line-symmetrical to the transport conveyor 3a with respect to a virtual line VI along the transporting direction (i.e., the transport conveyor 3b has such a structure that the structure of the transport conveyor 3a is reversed in the width direction).

Figure 4:
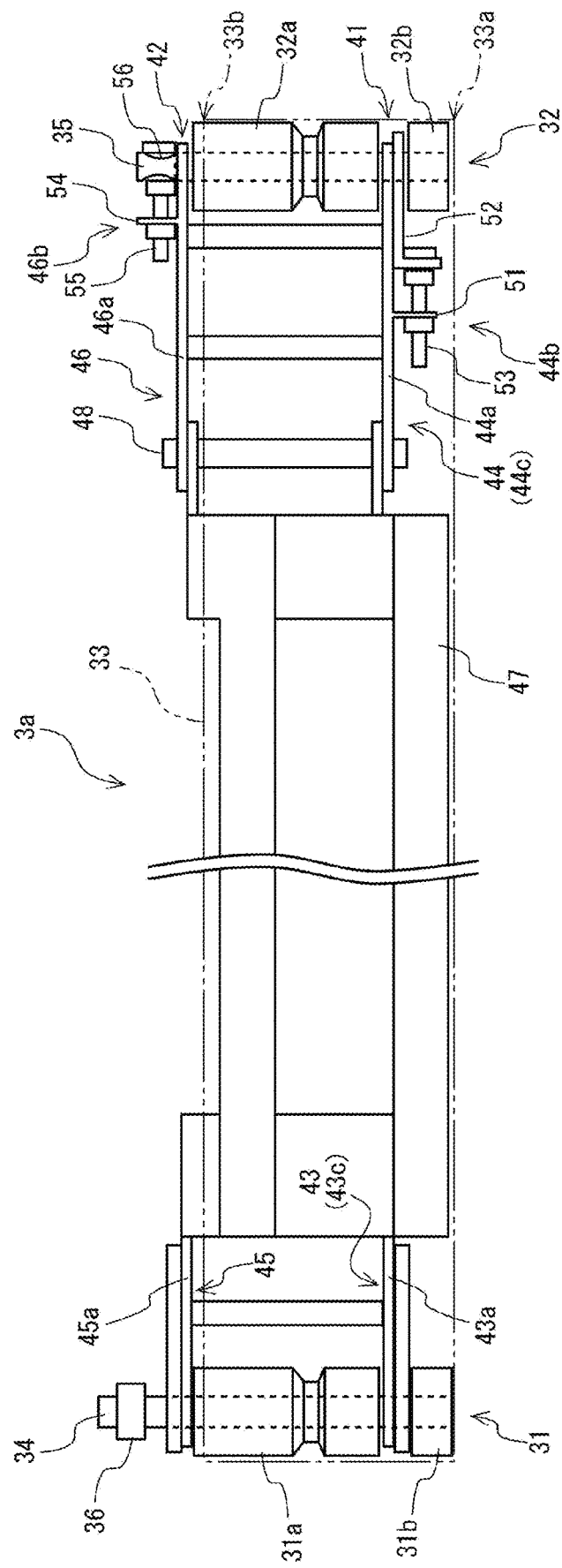
FIG. 4 is a plan view showing the structure of a transport conveyor of FIG. 1.

As shown in FIG. 4, the transport conveyor 3a includes a first pulley 31, a second pulley 32, a pair of frames 41 and 42, and a conveyor belt 33. The first pulley 31 is a driving pulley that rotates about a first rotating shaft 34. The second pulley 32 is a following pulley that rotates about a second rotating shaft 35. The pair of frames 41 and 42 extend in a direction orthogonal to the first rotating shaft 34 and the second rotating shaft 35 (i.e., extend in the transporting direction of the conveyor belt 33), and support the first rotating shaft 34 and the second rotating shaft 35.

The pair of frames include a first frame 41 and a second frame 42. The first frame 41 includes: a first driving-side frame 43, which supports the first rotating shaft 34; and a first following-side frame 44, which supports the second rotating shaft 35. Similar to the first frame 41, the second frame 42 includes: a second driving-side frame 45, which supports the first rotating shaft 34; and a second following-side frame 46, which supports the second rotating shaft 35. The frames 43 and 44 include a pair of frame bodies 43a and 44a, respectively, the pair of frame bodies 43a and 44a including respective outer surfaces that are orthogonal to the first rotating shaft 34 and the second rotating shaft 35, respectively; and the frames 45 and 46 include a pair of frame bodies 45a and 46a, respectively, the pair of frame bodies 45a and 46a including respective outer surfaces that are orthogonal to the first rotating shaft 34 and the second rotating shaft 35, respectively.

The first driving-side frame 43 and the second driving-side frame 45, and the first following-side frame 44 and the second following-side frame 46, are connected via a frame connector 47. The driving-side frames 43 and 45 and the frame connector 47 are fixedly connected. The following-side frames 44 and 46 and the frame connector 47 are connected via a rotating shaft 48, which is disposed in parallel with the first rotating shaft 34 and the second rotating shaft 35. Accordingly, the following-side frames 44 and 46 are rotatable about the rotating shaft 48 with respect to the driving-side frames 43 and 45 and the frame connector 47. Accordingly, in a state where the driving-side frames 43 and 45 (i.e., the driving mechanism side of the conveyor belt 33) are installed on the equipment body 22, tension adjusters 44b and 46b, which will be described below, can be exposed by rotating the following-side frames 44 and 46 about the rotating shaft 48. This makes it possible to readily perform tension adjustment of the conveyor belt 33 by using the tension adjusters 44b and 46b, which will be described below.

Between the first driving-side frame 43 and the second driving-side frame 45, the first pulley 31 (a first main pulley 31a described below) is disposed. The first pulley 31 is fixed to the first rotating shaft 34. As a result of the first rotating shaft 34 rotating about its center axis, the first pulley 31 rotates about the first rotating shaft 34. Driving force from an unshown driving motor is transmitted to a motive force transmitter 36 provided on the first rotating shaft 34, and consequently, the first rotating shaft 34 rotates about its center axis.

Between the first following-side frame 44 and the second following-side frame 46, the second pulley 32 (a second main pulley 32a described below) is disposed. The second rotating shaft 35 is fixed to the following-side frames 44 and 46 such that the second rotating shaft 35 is non-rotatable about its center axis. The second pulley 32 is mounted to the second rotating shaft 35 via an unshown bearing such that the second pulley 32 is rotatable about the second rotating shaft 35 relative to the second rotating shaft 35.

In the present embodiment, of the pair of frames 41 and 42, the first frame 41 (including the first driving-side frame 43 and the first following-side frame 44) is configured as an offset frame including offset supports 43c and 44c. The offset supports 43c and 44c support the first rotating shaft 34 and the second rotating shaft 35 at respective positions that are located inward of both ends (a first end 33a and a second end 33b) of the conveyor belt 33 in the width direction thereof. In the present embodiment, the first driving-side frame 43 and the first following-side frame 44 in their entirety are configured as the offset supports 43c and 44c. That is, the frame body 43a of the first driving-side frame 43 and the frame body 44a of the first following-side frame 44 are disposed between the first end 33a and the second end 33b of the conveyor belt 33 in the width direction of the conveyor belt 33.

Further, the following-side frames 44 and 46, which are included in the pair of frames 41 and 42, include the pair of tension adjusters 44b and 46b, which are connected to the frame bodies 44a and 46a, respectively. The pair of tension adjusters 44b and 46b are provided outward of the respective outer surfaces of the pair of frame bodies 44a and 46a in the width direction of the conveyor belt 33. That is, the first following-side frame 44 is provided with the first tension adjuster 44b, the position of which is shifted from the frame body 44a toward one end of the second rotating shaft 35 (specifically, toward the first end 33a of the conveyor belt 33). Also, the second following-side frame 46 is provided with the second tension adjuster 46b, the position of which is shifted from the frame body 46a toward the other end of the second rotating shaft 35 (specifically, toward the second end 33b of the conveyor belt 33).

The first tension adjuster 44b provided on the offset frame side is positioned between the offset support 44c and the end of the offset frame side of the conveyor belt 33 in the width direction thereof (i.e., the first end 33a). That is, the outer end of the first tension adjuster 44b is positioned inward of both ends of the conveyor belt 33 in the width direction thereof. Accordingly, the first end 33a of the conveyor belt 33 is a width-direction outer end of the entire transport conveyor 3a.

The first tension adjuster 44b adjusts the tension of the conveyor belt 33 by adjusting the distance between the first pulley 31 and the second pulley 32. The first tension adjuster 44b includes: an extension 51, which extends from the outer surface of the frame body 44a toward the first end 33a in the width direction of the conveyor belt 33; a flat plate-shaped slider 52, which is slidable on the outer surface of the frame body 44a; and a connector 53, which connects between the extension 51 and the slider 52. The slider 52 is configured such that: one end of the slider 52 in the longitudinal direction of the first following-side frame 44 supports the second rotating shaft 35; the other end of the slider 52 in the longitudinal direction of the first following-side frame 44 extends toward the first end 33a of the conveyor belt 33; and one end of the connector 53 is connected to the slider 52. That is, the frame body 44a of the first following-side frame 44 supports the second rotating shaft 35 via the first tension adjuster 44b (the slider 52).

The connector 53 is configured to adjust the distance between the extension 51 and the slider 52 in the longitudinal direction of the first following-side frame 44. For example, the connector 53 includes a bolt and a nut. In this case, the nut is fixed to the extension 51, in which a through-hole is formed. One end of the bolt is fixed to the slider 52. The other end of the bolt is passed through the through-hole formed in the extension 51, and screwed with the nut. That is, in a state where the bolt is passed through the through-hole of the extension 51, the extension 51 is positioned between both ends of the bolt. By adjusting the position of the nut on the bolt in the longitudinal direction of the bolt, the distance between the extension 51 and the slider 52 in the longitudinal direction of the first following-side frame can be adjusted.

The second tension adjuster 46b also adjusts the tension of the conveyor belt 33 by adjusting the distance between the first pulley 31 and the second pulley 32. Similar to the first tension adjuster 44b, the second tension adjuster 46b includes: an extension 54, which extends from the outer surface of the frame body 46a toward the second end 33b in the width direction of the conveyor belt 33; and a connector 55. However, the connector 55 connects between the extension 54 and the second rotating shaft 35. Accordingly, an end portion of the second rotating shaft 35 on the second following-side frame 46 side is provided with a through-hole 56, which extends in a radial direction. In a state where the connector 55 is inserted in the through-hole 56, the connector 55 is connected to the second rotating shaft 35. That is, the frame body 46a of the second following-side frame 46 supports the second rotating shaft 35 via the second tension adjuster 46b (the connector 55).

The connector 55 is configured to adjust the distance between the extension 54 and the second rotating shaft 35 in the longitudinal direction of the second following-side frame 46. For example, the connector 55 also includes a bolt and a nut. In this case, the nut is fixed to the extension 54, in which a through-hole is formed. In a state where the bolt is inserted through the through-hole 56, the bolt is fixed to the second rotating shaft 35. The other end of the bolt is passed through the through-hole formed in the extension 54, and screwed with the nut. That is, in a state where the bolt is passed through the through-hole of the extension 54, the extension 54 is positioned between both ends of the bolt. By adjusting the position of the nut on the bolt in the longitudinal direction of the bolt, the distance between the extension 54 and the second rotating shaft 35 in the longitudinal direction of the second following-side frame 46 can be adjusted.

The first pulley 31 includes the first main pulley 31a and a first auxiliary pulley 31b. The first main pulley 31a is disposed between the pair of driving-side frames 43 and 45. The first auxiliary pulley 31b is, in the width direction of the conveyor belt 33, disposed outward of the outer surface of the frame body 43a of the first driving-side frame 43, which is an offset frame. That is, the first auxiliary pulley 31b is disposed outward of the offset support 43c of the first driving-side frame 43. Similarly, the second pulley 32 includes the second main pulley 32a and a second auxiliary pulley 32b. The second main pulley 32a is disposed between the pair of following-side frames 44 and 46. The second auxiliary pulley 32b is, in the width direction of the conveyor belt 33, disposed outward of the outer surface of the frame body 44a of the first following-side frame 44, which is an offset frame. That is, the second auxiliary pulley 32b is disposed outward of the offset support 44c of the first following-side frame 44. The outer ends of the respective auxiliary pulleys 31b and 32b in the width direction of the conveyor belt 33 are each located at the same position as, or located inward of, the first end 33a of the conveyor belt 33.

As described above, according to the present embodiment, at the offset supports 43c and 44c of the offset frame (the first frame 41), gaps between the first frame 41 and the pulleys 31 and 32 are positioned inward of both ends of the conveyor belt 33 in the width direction thereof. For this reason, even if scraps, dust, etc. fall from the end of the offset frame side of the conveyor belt 33 in the width direction thereof, the scraps, dust, etc. can be prevented from entering the gaps. Therefore, the transport conveyors 3a and 3b can be kept hygienic, and smooth rotation of the pulleys 31 and 32 can be maintained. This makes it possible to reduce maintenance frequency.

Further, according to the present embodiment, the auxiliary pulleys 31b and 32b are disposed outward of the offset supports 43c and 44c of the offset frame, respectively. Accordingly, at both ends of the conveyor belt 33 in the width direction thereof, the pulleys 31 and 32 can be made in contact with the conveyor belt 33 while the supporting positions of the rotating shafts 34 and 35 on at least one of the pair of frames 41 and 42 are located inward of both ends of the conveyor belt 33 in the width direction thereof. As a result, in the width direction of the conveyor belt 33, at the end of the offset frame side of each of the main pulleys 31a and 32a (i.e., at positions that are inward of both ends of the conveyor belt 33 in the width direction thereof), excessive tension of the conveyor belt 33 can be prevented from occurring. Consequently, deterioration of the conveyor belt 33 due to such excessive tension can be suppressed.

Further, according to the present embodiment, the first tension adjuster 44b provided on the offset frame side is positioned inward of both ends of the conveyor belt 33 in the width direction thereof. Accordingly, for example, in a case where the V-shaped transport mechanism 3 is configured by arranging the two transport conveyors 3a and 3b in a V shape, by arranging the two transport conveyors 3a and 3b such that their offset frame sides are positioned at the valley (i.e., in the middle) of the V shape, the gap 3s between the two conveyor belts 33 can be made small.

Figure 5:
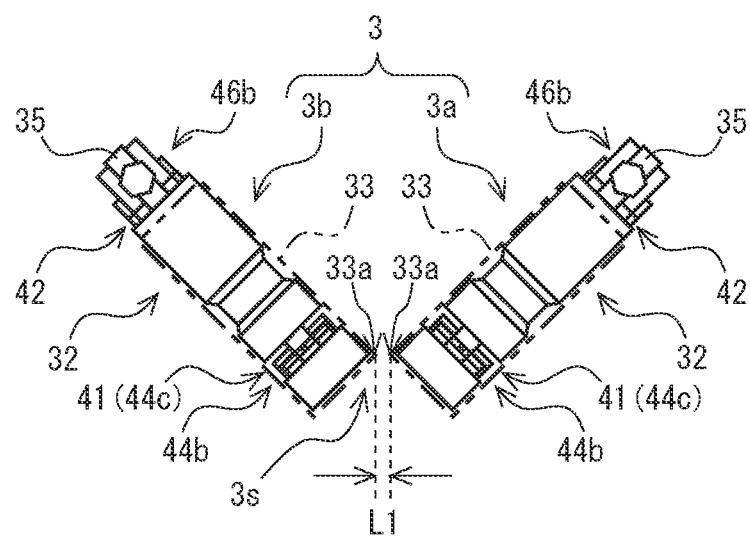
FIG. 5 shows an arrangement example of a V-shaped transport mechanism in which the transport conveyor of FIG. 4 is used.

As shown in FIG. 5, in the case of configuring the V-shaped transport mechanism 3 by using the transport conveyor 3a shown in FIG. 4, the first rotating shaft 34 and the second rotating shaft 35 are arranged in an inclined manner such that the offset frame of the transport conveyor 3a (i.e., the first frame 41) is positioned at a lower elevation than the other frame (i.e., the second frame 42) (i.e., positioned in the middle of the V shape). It should be noted that FIG. 5 is a view seen from the downstream side of the transporting direction (i.e., seen from the second pulley 32 side).

Further, the transport conveyor 3b has such a structure that the positional relationship between the offset frame and the other frame is, as seen from the transporting direction (e.g., as seen from the second pulley 32 side), left-right reversed. Also in the transport conveyor 3b, the first rotating shaft 34 and the second rotating shaft 35 are arranged in an inclined manner such that the offset frame is positioned at a lower elevation than the other frame (i.e., positioned in the middle of the V shape). That is, the offset frames of the respective two transport conveyors 3a and 3b are arranged adjacently to each other to form the valley region of the V-shaped transport mechanism 3.

Figure 7:
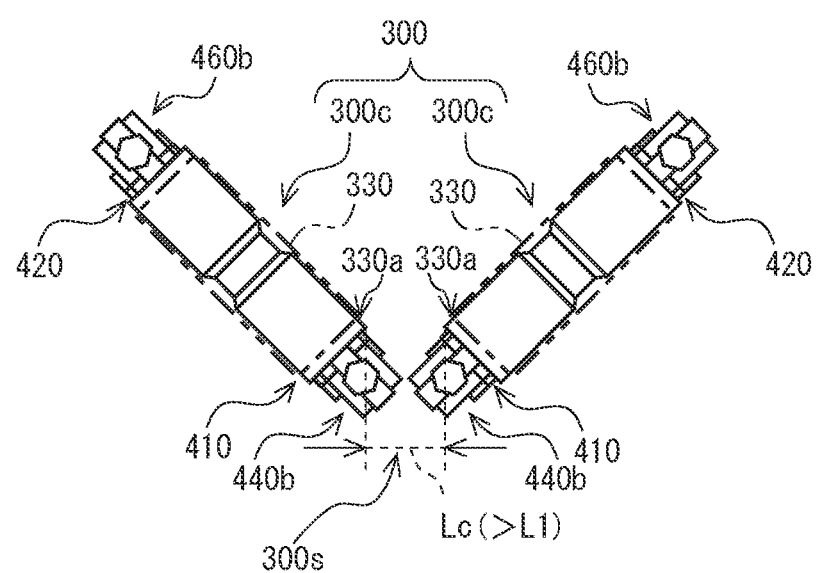
FIG. 7 shows an arrangement example of a V-shaped transport mechanism in which transport conveyors according to a comparative example are used.

As a comparative example, FIG. 7 shows a V-shaped transport mechanism in which transport conveyors having a conventional configuration are used. FIG. 7 shows a V-shaped transport mechanism 300 including two transport conveyors 300c, each of which includes a pair of frames 410 and 420. Both the frames 410 and 420 are configured in the same manner as the second frame 42 shown in FIG. 4. That is, the pair of frames 410 and 420 are both positioned outward of both ends of a conveyor belt 330 in the width direction thereof. Accordingly, tension adjusters 440b and 460b provided outward of the pair of frames 410 and 420, respectively, are arranged so as to protrude from the conveyor belt 330 toward both sides in the width direction of the conveyor belt 330.

Therefore, in the case of configuring the V-shaped transport mechanism 300 by using these two transport conveyors 300c, a gap 300s between the two transport conveyors 300c cannot be made small. That is, if the two transport conveyors 300c (specifically, first ends 330a of the respective conveyor belts 330) are brought close to each other, it results in a situation where their tension adjusters 440b interfere with each other, and for this reason, a width-direction distance Lc between the two transport conveyors 300c cannot be made small.

Generally speaking, a V-shaped transport mechanism can be used for transporting spherical (lump) objects to be weighed that are called round objects (e.g., potatoes, onions, cherry tomatoes, etc.) or rod-shaped objects to be weighed that are called long objects (e.g., carrots, asparagus, etc.). By using the V-shaped transport mechanism to transport spherical objects to be weighed, the spherical objects can be prevented from rolling in the width direction. Also, by using the V-shaped transport mechanism to transport rod-shaped objects to be weighed, the rod-shaped objects can be aligned in their longitudinal direction while transporting them.

However, in the V-shaped transport mechanism 300 as shown in FIG. 7, the gap 300s between the two transport conveyors 300c is great. For this reason, small-sized objects to be weighed (e.g., cherry tomatoes or asparagus) may fall through the gap 300s, or may get caught between the two transport conveyors 300c. Thus, it is difficult to transport such small-sized objects by using the V-shaped transport mechanism 300 shown in FIG. 7.

On the other hand, in the case of configuring the V-shaped transport mechanism 3 by using the transport conveyors 3a and 3b of the present embodiment, each first tension adjuster 44b, which adjusts the tension of the conveyor belt 33, is disposed between the offset frame and the end of the offset frame side of the conveyor belt 33 in the width direction thereof (i.e., the first end 33a). That is, each first tension adjuster 44b is positioned inward of the first end 33a of the conveyor belt 33 in the width direction thereof. Therefore, even though the two transport conveyors 3a and 3b are brought close to each other, their first tension adjusters 44b do not interfere with each other at the gap 3s between the two transport conveyors 3a and 3b. Accordingly, the first ends 33a of the conveyor belts 33 of the two transport conveyors 3a and 3b can be brought close to each other, and thereby a width-direction distance L1 between the two transport conveyors 3a and 3b can be made smaller (i.e., L1<Lc). This makes it possible to suppress objects to be weighed, scraps of the objects, etc. from falling through the gap between the two conveyor belts 33.

Further, according to the V-shaped transport mechanism 3 of the present embodiment, each of the two transport conveyors 3a and 3b is arranged such that the offset frame side thereof is positioned at a lower elevation. Accordingly, even if scraps of objects to be weighed, dust, etc. fall from the end of the offset frame side of the conveyor belt 33 in the width direction thereof (i.e., the first end 33a), the scraps, dust, etc. can be prevented from entering the gaps between the offset frame and the pulleys 31 and 32. Therefore, the transport conveyors 3a and 3b can be kept hygienic, and smooth rotation of the pulleys 31 and 32 can be maintained. This makes it possible to reduce maintenance frequency.

Figure 6:
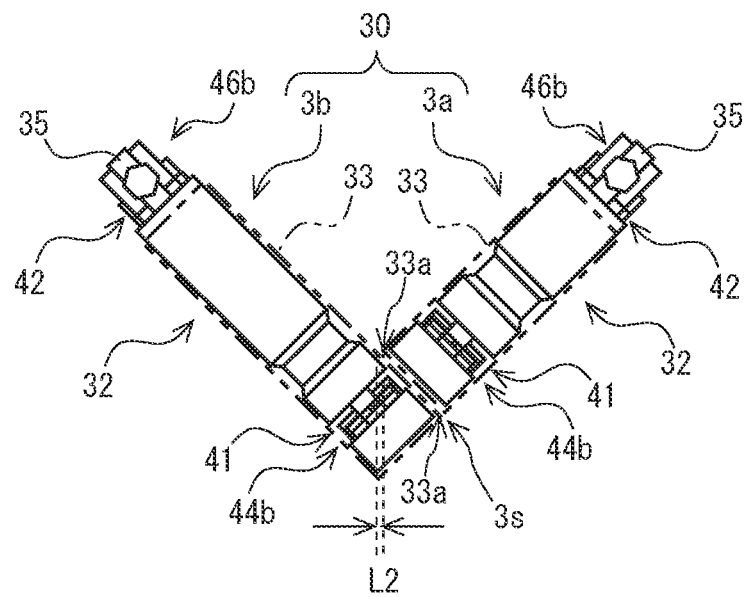
FIG. 6 shows another arrangement example of the V-shaped transport mechanism in which the transport conveyor of FIG. 4 is used.

Further, FIG. 6 shows a variation of the V-shaped transport mechanism of the present embodiment. FIG. 6 shows a V-shaped transport mechanism 30, in which the transport conveyor 3a, which is one of the two transport conveyors 3a and 3b, is arranged such that the end of the offset frame side of the transport conveyor 3a in the width direction of the conveyor belt 33 (i.e., the first end 33a) is positioned over the conveyor belt 33 of the transport conveyor 3b, which is the other one of the two transport conveyors 3a and 3b. The configurations of these transport conveyors 3a and 3b are the same as those of the transport conveyors 3a and 3b shown in FIG. 5, except that the width of the conveyor belt 33 and the lengths of the respective pulleys 31 and 32 (the respective rotating shafts 34 and 35) of the transport conveyor 3b are greater than those of the transport conveyor 3a.

According to the variation shown in FIG. 6, no gap is formed immediately under the valley region formed by the two transport conveyors 3a and 3b, but the gap 3s is formed along the transport surface of the transport conveyor 3b, which is positioned on the lower side. According to this configuration, the gap between the two conveyor belts 33 can be further reduced.

It should be noted that the transport conveyor 3b may be arranged such that it is positioned over the conveyor belt 33 of the transport conveyor 3a. In this case, the width of the conveyor belt 33 and the lengths of the respective pulleys 31 and 32 (the respective rotating shafts 34 and 35) of the transport conveyor 3a may be greater than those of the transport conveyor 3b. Further, regardless of the vertical positional relationship between the transport conveyors 3a and 3b, the width of the conveyor belt 33 and the lengths of the respective pulleys 31 and 32 (the respective rotating shafts 34 and 35) of the transport conveyor 3a may be equal to those of the transport conveyor 3b.

Although one embodiment of the present invention has been described above, the present invention is not limited to the above embodiment, and various modifications, additions, and deletions can be made to the configurations of the above embodiment without departing from the scope of the present invention.

For example, the above embodiment illustratively describes the configurations of the transport conveyors 3a and 3b, in each of which one frame of the pair of frames 41 and 42 (i.e., the first frame 41) is an offset frame. Alternatively, both of the pair of frames 41 and 42 may be offset frames. In this case, if the transport conveyor 3a is used as a horizontal transport mechanism that is arranged such that the transport surface thereof is horizontal, even if scraps, dust, etc. fall from both ends of the conveyor belt 33 in the width direction thereof, the scraps, dust, etc. can be prevented from entering the gaps between the frames 41, 42 and the pulleys 31, 32.

The above embodiment describes the example in which the first driving-side frame 43 and the first following-side frame 44 in their entirety are configured as the offset supports 43c and 44c. This is merely a non-limiting example, and other alternative configurations are adoptable, so long as the supporting positions of the first rotating shaft 34 and the second rotating shaft 35 are located inward of both ends of the conveyor belt 33 in the width direction thereof. For example, the frame body 43a of the first driving-side frame 43 may include: a first frame portion that extends in the transporting direction and that is, in a first opposite region opposite the first pulley 31, positioned inward of both ends of the conveyor belt 33 in the width direction thereof; a second frame portion that extends in the transporting direction and that is, in a region other than the first opposite region, positioned outward of both ends of the conveyor belt 33 in the width direction thereof; and a third frame portion that extends in a direction orthogonal to the transporting direction and that connects between the first frame portion and the second frame portion. In this case, the first frame portion is configured as an offset support.

Also, for example, the frame body 44a of the first following-side frame 44 may include: a first frame portion that extends in the transporting direction and that is, in a second opposite region opposite the second pulley 32 and the first tension adjuster 44b, positioned inward of both ends of the conveyor belt 33 in the width direction thereof; a second frame portion that extends in the transporting direction and that is, in a region other than the second opposite region, positioned outward of both ends of the conveyor belt 33 in the width direction thereof; and a third frame portion that extends in a direction orthogonal to the transporting direction and that connects between the first frame portion and the second frame portion. In this case, the first frame portion is configured as an offset support.

The above embodiment describes the example in which the angle formed by the two transport conveyors 2a and 2b included in the V-shaped transport mechanism 3 is about 90 degrees. Alternatively, this angle may be greater than, or less than, 90 degrees. Further, the angle formed by the two first rotating shafts 34, and the angle formed by the two second rotating shafts 35, may be different from each other. For example, the angle formed by the two first rotating shafts 34 (i.e., the angle formed on the upstream side in the transporting direction) may be about 90 degrees, whereas the angle formed by the two second rotating shafts 35 (i.e., the angle formed on the downstream side in the transporting direction) may be about 120 degrees.

The above embodiment describes the example in which each of the two transport conveyors 3a and 3b included in the V-shaped transport mechanism 3 includes the offset frame including the offset supports 43c and 44c, and is arranged in an inclined manner such that the offset frame is positioned at a lower elevation than the other frame. Alternatively, only one of the two transport conveyors included in the V-shaped transport mechanism 3 may be arranged in an inclined manner such that the offset frame thereof is positioned at a lower elevation than the other frame.

For example, the V-shaped transport mechanism 3 may be configured by using the two transport conveyors 3a. In this case, one transport conveyor 3a is arranged in an inclined manner such that the offset frame thereof is positioned at a lower elevation than the other frame, whereas the other transport conveyor 3a is arranged in an inclined manner such that the offset frame thereof is positioned at a higher elevation than the other frame. As another example, the V-shaped transport mechanism 3 may be configured by using the transport conveyor 3a shown in FIG. 4 and the transport conveyor 300c shown in FIG. 7. In both of these examples, one tension adjuster is present at the gap between the two transport conveyors. Accordingly, in these examples, the width-direction distance between the two transport conveyors is greater than that in the examples shown in FIG. 5 and FIG. 6, but is less than that in the comparative example shown in FIG. 7 (i.e., less than that in a conventional configuration in which two tension adjusters are present at the gap between the two transport conveyors).

In the V-shaped transport mechanism 30 shown in FIG. 6, the transport conveyor 3a or the transport conveyor 300c may be used instead of the transport conveyor 3b, which is positioned on the lower side relative to the transport conveyor 3a. Also in these cases, a width-direction distance L2 between the two transport conveyors is the same as that in the case of FIG. 6, and thus the gap between the two conveyor belts 33 can be made small.

The above embodiment describes the examples in which the transport conveyors 3a and 3b and the V-shaped transport mechanisms 3 and 30 are each applied to a semi-automatic combination weigher. The transport conveyors 3a and 3b or the V-shaped transport mechanisms 3 and 30, according to the above-described embodiment and variation, are applicable also to automatic combination weighers. The transport conveyors 3a and 3b or the V-shaped transport mechanisms 3 and 30, according to the above-described embodiment and variation, are suitably applicable not only to combination weighers, but also to various apparatuses or systems including a mechanism for transporting predetermined articles (i.e., objects to be weighed).

REFERENCE CHARACTER LIST 3,30 V-shaped transport mechanism
3a, 3b transport conveyor
31 first pulley
31a first main pulley
32a first auxiliary pulley
32 second pulley
32a second main pulley
32b second auxiliary pulley
33 conveyor belt
34 first rotating shaft
35 second rotating shaft
41 first frame (offset frame)
42 second frame
43 first driving-side frame (offset frame)
43a, 44a frame body
43c, 44c offset support
44 first following-side frame (offset frame)
44b first tension adjuster (tension adjuster provided on the offset frame side)

The invention claimed is:

1. A transport conveyor comprising:
a first pulley that rotates about a first rotating shaft;
a second pulley that rotates about a second rotating shaft;
a pair of frames that support the first rotating shaft and the second rotating shaft; and
a conveyor belt wound around, and extending between, the first pulley and the second pulley, wherein
at least one frame of the pair of frames is configured as an offset frame including offset supports, the offset supports supporting the first rotating shaft and the second rotating shaft at respective positions that are located inward of both ends of the conveyor belt in a width direction thereof,
the pair of frames include:
a pair of frame bodies including respective outer surfaces that are orthogonal to the first rotating shaft and the second rotating shaft; and
a pair of tension adjusters that are connected to the pair of frame bodies and that adjust tension of the conveyor belt by adjusting a distance between the first pulley and the second pulley,
the pair of tension adjusters are provided outward of the respective outer surfaces of the pair of frame bodies in the width direction of the conveyor belt, and
of the pair of tension adjusters, the tension adjuster provided on the offset frame side is positioned between one of the offset supports and an end of the offset frame side of the conveyor belt in the width direction thereof.

2. The transport conveyor according to claim 1, wherein each of the first pulley and the second pulley includes:
a main pulley that is disposed between the pair of frame bodies; and
an auxiliary pulley that is, in the width direction of the conveyor belt, disposed outward of one of the offset supports of the offset frame.

3. A V-shaped transport mechanism in which two transport conveyors are arranged such that, as seen in a transporting direction, transport surfaces of the respective two transport conveyors are in a V shape, wherein
one transport conveyor of the two transport conveyors is the transport conveyor according to claim 1, and
in the one transport conveyor, the first rotating shaft and the second rotating shaft are arranged in an inclined manner, such that the offset frame is positioned at a lower elevation than the other frame.

4. The V-shaped transport mechanism according to claim 3, wherein
the one transport conveyor is arranged such that an end of the offset frame side of the one transport conveyor in the width direction of the conveyor belt is positioned over the conveyor belt of the other transport conveyor of the two transport conveyors.

5. A V-shaped transport mechanism in which two transport conveyors are arranged such that, as seen in a transporting direction, transport surfaces of the respective two transport conveyors are in a V shape, wherein
one transport conveyor of the two transport conveyors is the transport conveyor according to claim 2, and
in the one transport conveyor, the first rotating shaft and the second rotating shaft are arranged in an inclined manner, such that the offset frame is positioned at a lower elevation than the other frame.

6. The V-shaped transport mechanism according to claim 5, wherein
the one transport conveyor is arranged such that an end of the offset frame side of the one transport conveyor in the width direction of the conveyor belt is positioned over the conveyor belt of the other transport conveyor of the two transport conveyors.

* * * * *